United States Patent
Zewail et al.

(10) Patent No.: US 11,695,530 B2
(45) Date of Patent: Jul. 4, 2023

(54) DMRS DESIGN FOR DFT-S-OFDM WITH INCREASED SUBCARRIER SPACING

(71) Applicant: QUALCOMM Incorporated, San Diego, CA (US)

(72) Inventors: Ahmed Abdelaziz Ibrahim Abdelaziz Zewail, San Diego, CA (US); Zhifei Fan, San Diego, CA (US); Xiaoxia Zhang, San Diego, CA (US); Jing Sun, San Diego, CA (US); Tao Luo, San Diego, CA (US); Wooseok Nam, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/150,910

(22) Filed: Jan. 15, 2021

(65) Prior Publication Data

US 2022/0231814 A1 Jul. 21, 2022

(51) Int. Cl.
*H04L 5/00* (2006.01)
*H04W 72/02* (2009.01)
*H04W 72/23* (2023.01)

(52) U.S. Cl.
CPC ........... *H04L 5/0053* (2013.01); *H04W 72/23* (2023.01)

(58) Field of Classification Search
CPC ... H04L 5/0053; H04L 5/0051; H04L 5/0094; H04L 5/0092; H04W 72/04; H04W 72/042; H04W 72/23; H04W 72/25
See application file for complete search history.

(56) References Cited

U.S. PATENT DOCUMENTS

| | | | | |
|---|---|---|---|---|
| 9,054,836 B2* | 6/2015 | Han | .............. | H04L 65/1066 |
| 9,992,693 B2* | 6/2018 | Kuo | .............. | H04W 72/04 |
| 10,027,391 B2* | 7/2018 | Janis | .............. | H04L 1/0643 |
| 2013/0250882 A1* | 9/2013 | Dinan | .............. | H04L 5/0053 |
| | | | | 370/329 |
| 2013/0258973 A1* | 10/2013 | Khoshnevis | .......... | H04L 1/0028 |
| | | | | 370/329 |
| 2016/0095120 A1* | 3/2016 | Gaal | .............. | H04L 5/0007 |
| | | | | 370/329 |
| 2019/0268904 A1* | 8/2019 | Miao | .............. | H04W 52/02 |
| 2021/0250149 A1* | 8/2021 | Muruganathan | ...... | H04L 5/0078 |
| 2022/0094481 A1* | 3/2022 | Hong | .............. | H04L 1/1861 |

FOREIGN PATENT DOCUMENTS

| | | | | |
|---|---|---|---|---|
| CN | 107801243 | * | 8/2016 | ............ H04W 72/04 |
| CN | 113348724 | * | 11/2019 | ............ H04W 76/27 |

* cited by examiner

*Primary Examiner* — Diane L Lo
*Assistant Examiner* — Abusayeed M Haque
(74) *Attorney, Agent, or Firm* — Qualcomm Incorporated

(57) ABSTRACT

This disclosure provides systems, devices, apparatus, and methods, including computer programs encoded on storage media, for DMRS design for DFT-s-OFDM with increased subcarrier spacing. A UE may receive an assignment to transmit on a set of RBs. The set of RBs may be contiguous within a carrier that includes greater than 110 RBs. The UE may transmit DMRS on each RE of one or more adjacent symbols of the set of RBs.

26 Claims, 9 Drawing Sheets

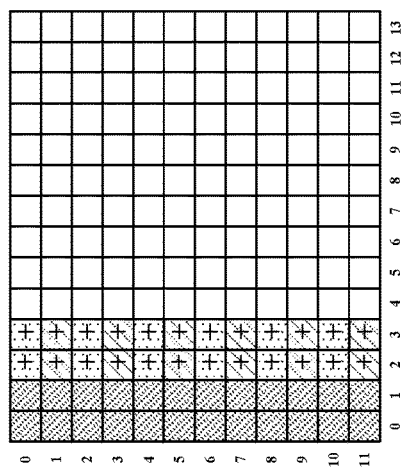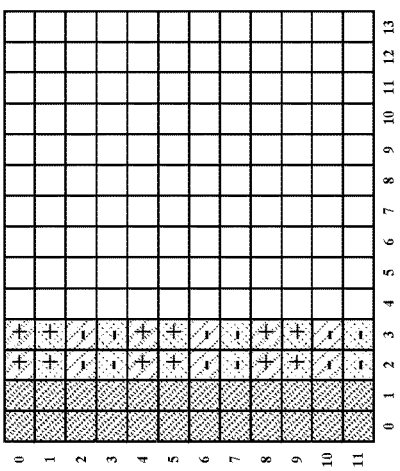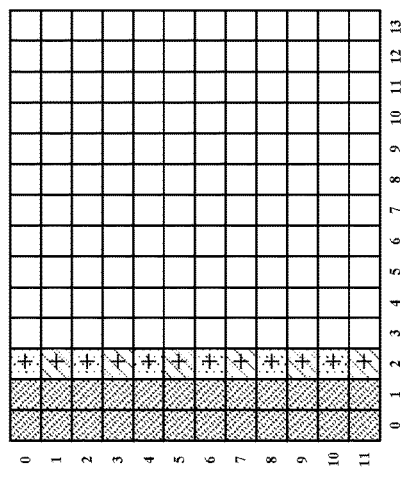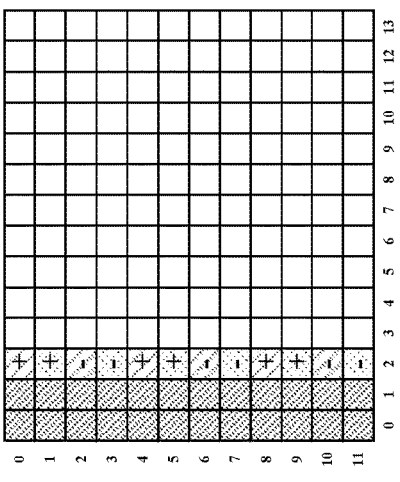
FIG. 5

DMRS DESIGN FOR DFT-S-OFDM WITH INCREASED SUBCARRIER SPACING

BACKGROUND

Technical Field

The present disclosure relates generally to communication systems, and more particularly, to demodulation reference signal (DMRS) design for discrete Fourier transform spread orthogonal frequency division multiplexing (DFT-s-OFDM) with increased subcarrier spacing.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

DMRS configuration Type 1 may be used for physical uplink shared channel (PUSCH) transmissions associated with single carrier waveforms (e.g., DFT-s-OFDM). When the DMRS is transmitted by a user equipment (UE) over a subset of resource elements (REs) per resource block (RB), such as every other RE of a symbol, the channel may be estimated for the REs that do not include the DMRS by interpolating between the REs that do include the DMRS. However, as subcarrier spacing is increased, an accuracy of such estimations/interpolations may decrease.

Accordingly, the UE may transmit the DMRS on each of 12 vertically arranged REs per RB to improve channel estimations, e.g., by excluding a need to perform interpolation procedures. Since each subcarrier of the RB may be associated with an RE that includes the DMRS, there may be no gaps between the REs for which interpolation may be performed. A number of contiguous RBs including such DMRS configurations within a carrier may be greater than 110 RBs. To transmit the DMRS on each of the REs, the UE may transmit first DMRS having a first cyclic shift based on a first port and second DMRS having a second cyclic shift based on a second port; transmit the first DMRS on a first set of subcarriers and the second DMRS on a second set of subcarriers (e.g., interleave the REs including the first DMRS and the second DMRS on a symbol of the RB); transmit the first DMRS on all 12 REs of a first symbol of the RB and the second DMRS on all 12 REs of a second symbol of the RB; or interleave the REs including the first DMRS and the second DMRS on the first symbol of the RB and interleave the REs including the second DMRS and the first DMRS on the second symbol of the RB, such that the interleaving is staggered between the first symbol and the second symbol.

In an aspect of the disclosure, a method, a computer-readable medium, and an apparatus are provided. The apparatus may receive an assignment to transmit on a set of resource blocks (RBs), the set of RBs being contiguous within a carrier including greater than 110 RBs; and transmit demodulation reference signals (DMRS) on each resource element (RE) of one or more adjacent symbols of the set of RBs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 illustrates diagrams of Type 1 DMRS configurations based on 1 OFDM symbol and 2 OFDM symbols.

DETAILED DESCRIPTION

Figure 1:
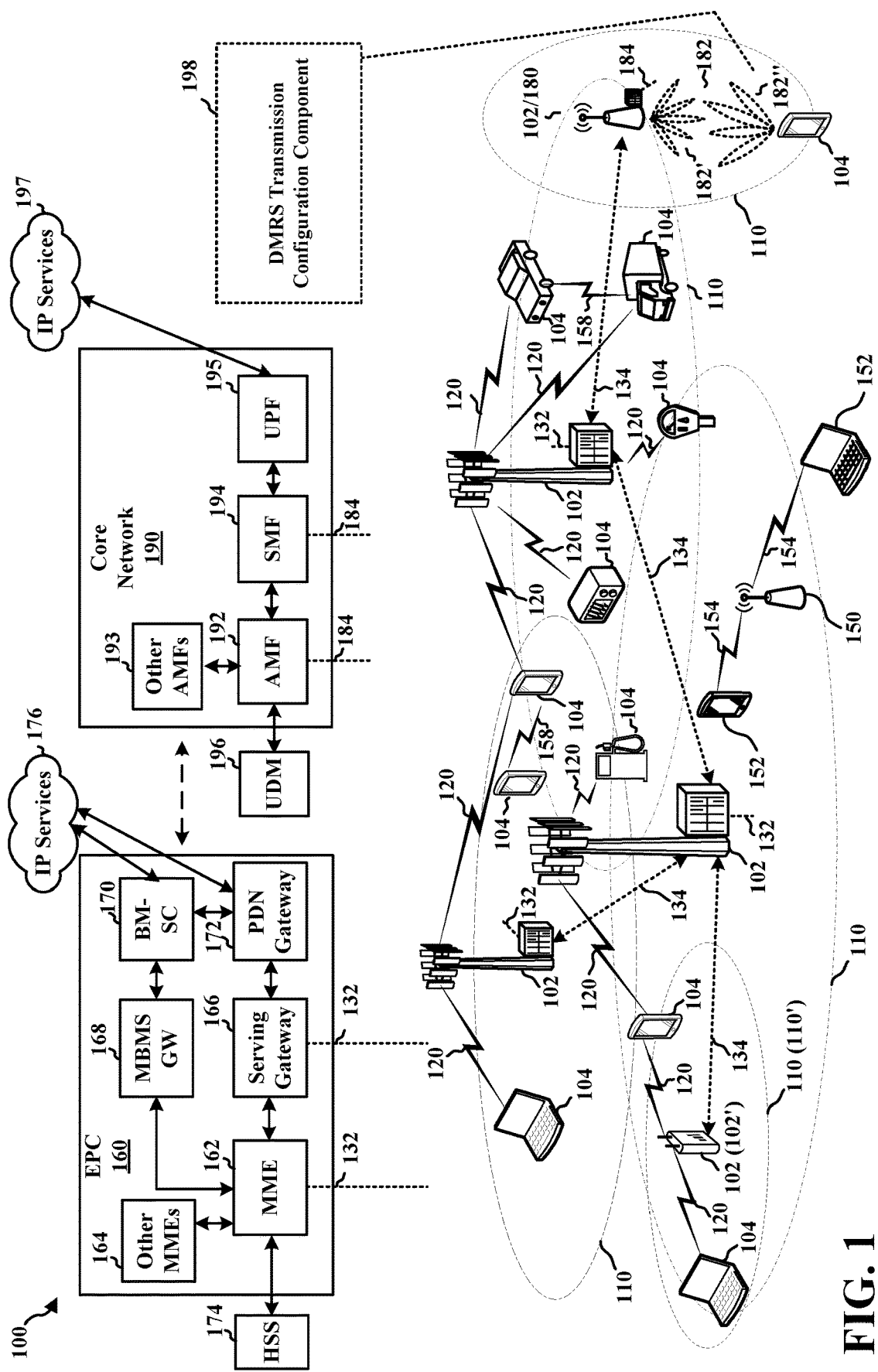
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a demodulation reference signals (DMRS) transmission configuration component 198 configured to receive an assignment to transmit on a set of resource blocks (RBs), the set of RBs being contiguous within a carrier including greater than 110 RBs; and transmit DMRS on each resource element (RE) of one or more adjacent symbols of the set of RBs. Although the following description may be focused on 5G NR, the concepts described herein may be applicable to other similar areas, such as LTE, LTE-A, CDMA, GSM, and other wireless technologies.

Figure 2:
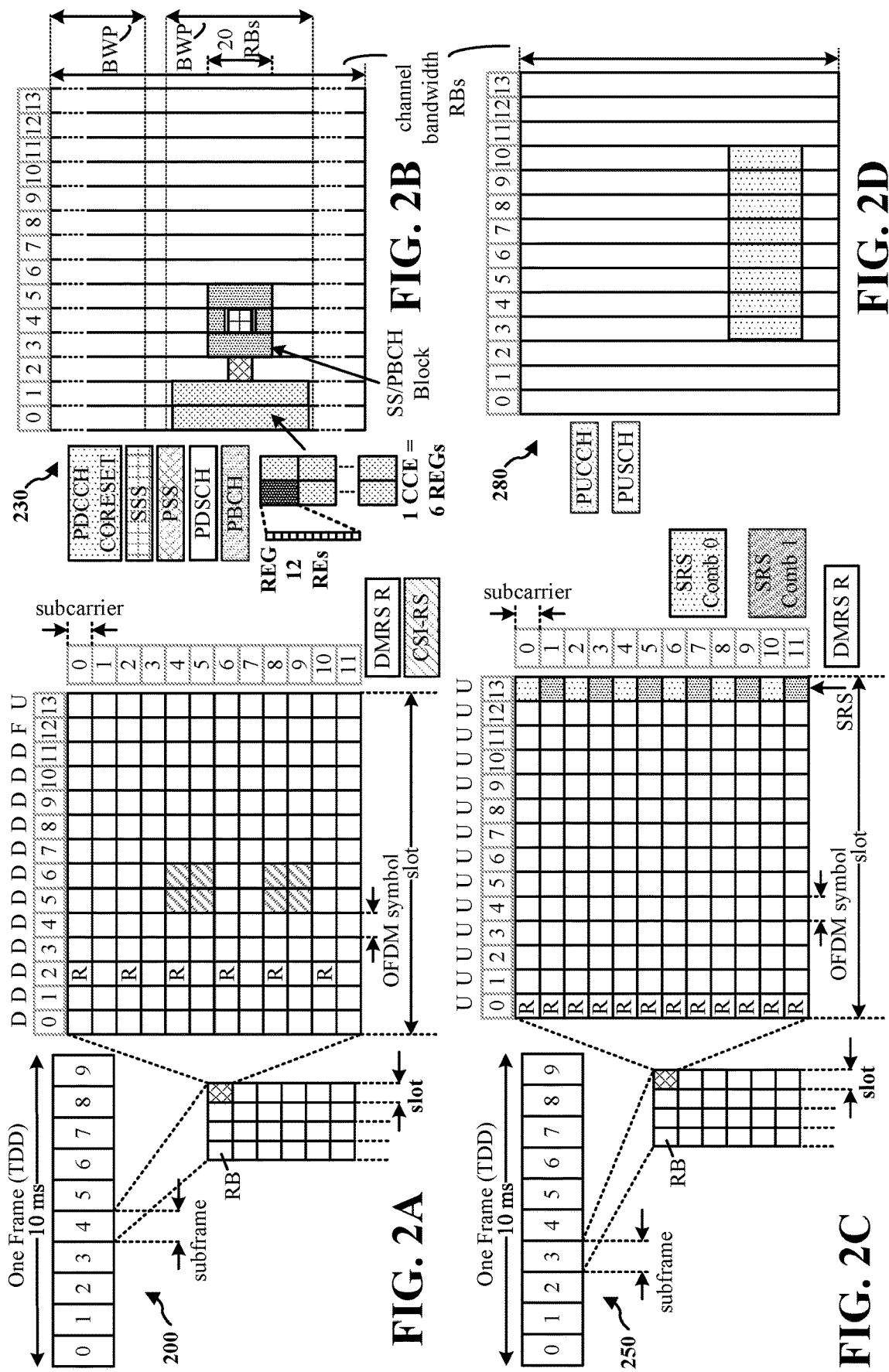
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as R for one particular configuration, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
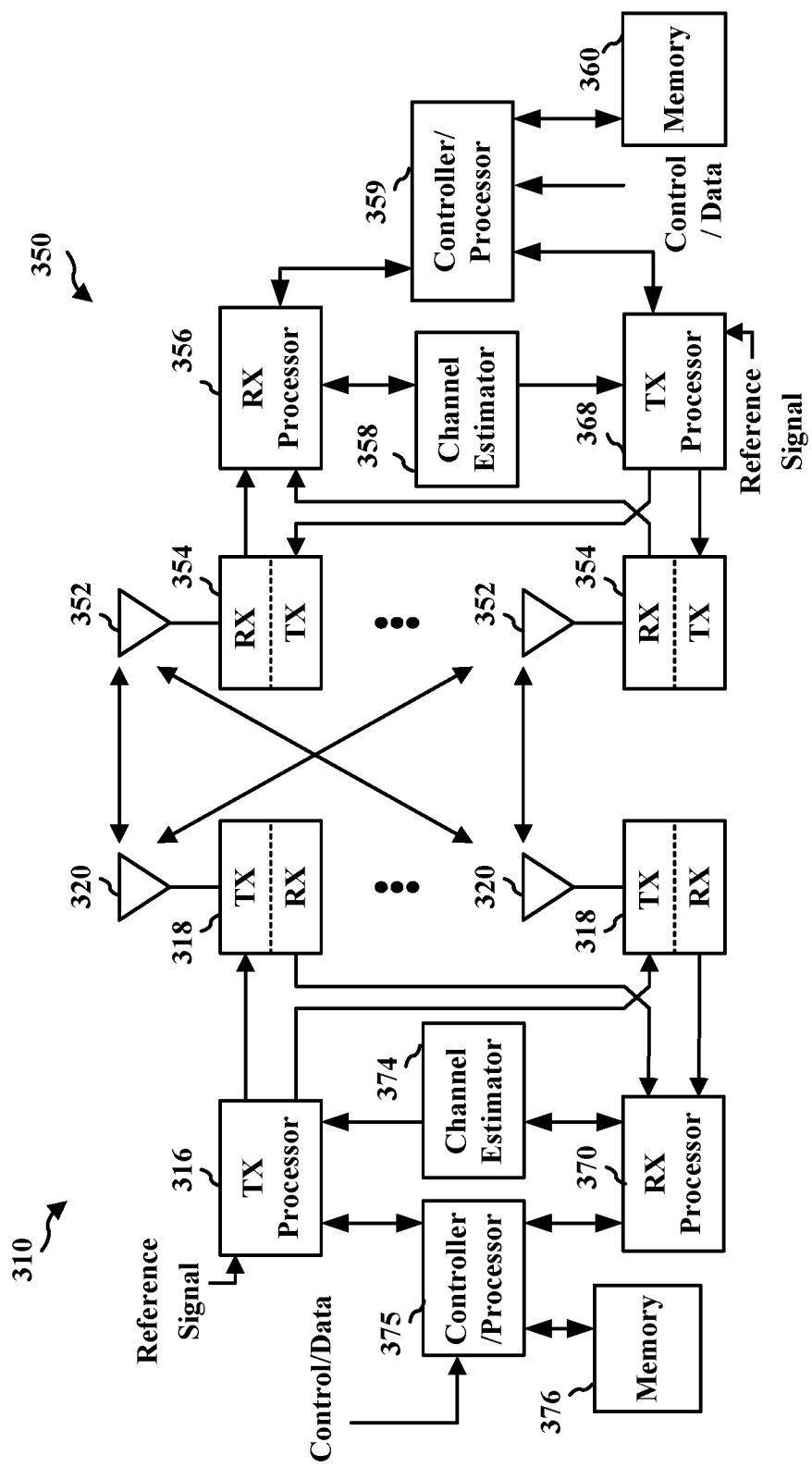
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the DMRS transmission configuration component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
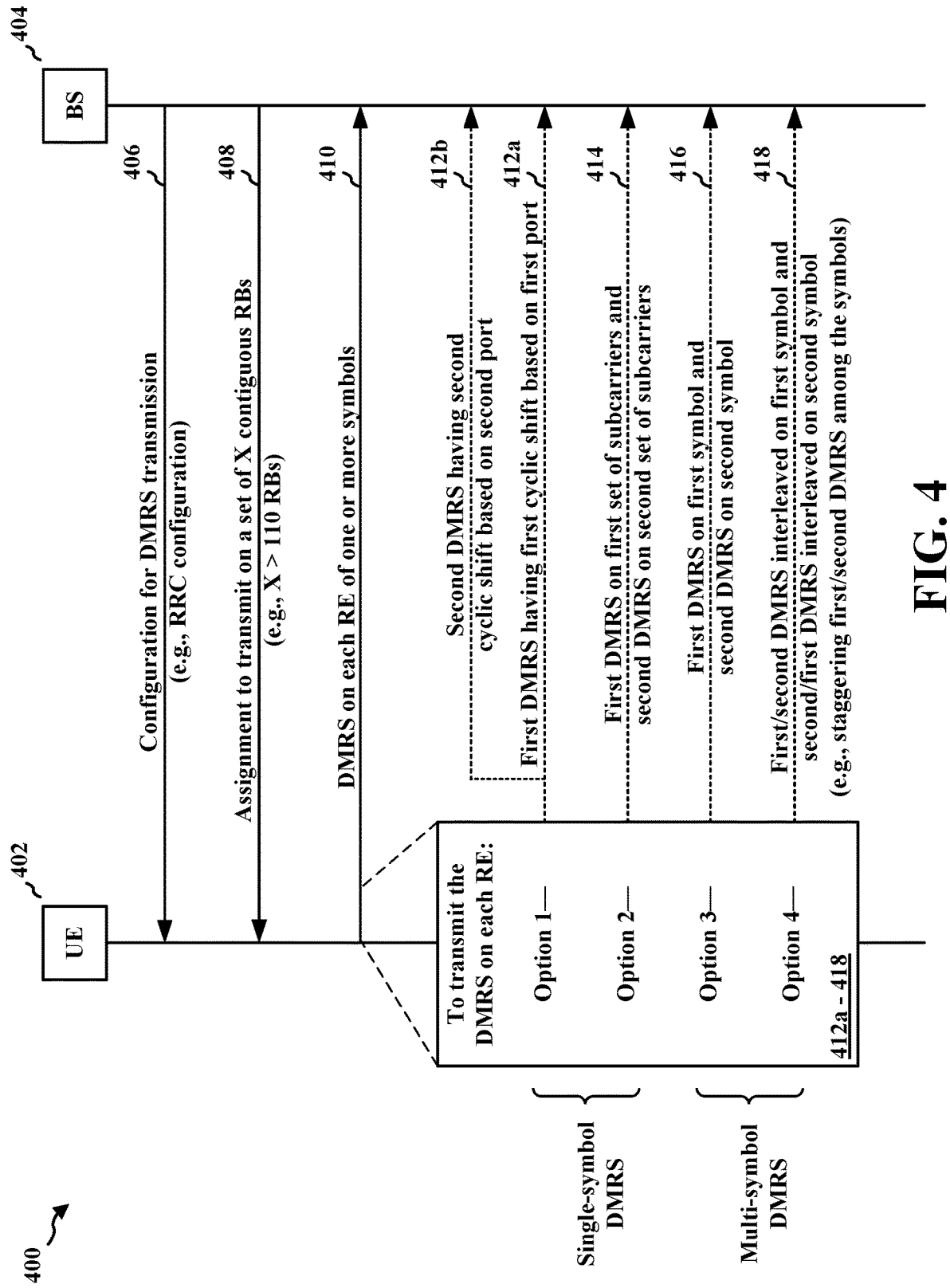
FIG. 4 is a call flow diagram illustrating communications between a UE and a base station.

FIG. 4 is a call flow diagram 400 illustrating communications between a UE 402 and a base station 404. At 406, the UE 402 may receive, from the base station 404, a configuration for a DMRS transmission. The configuration for the DMRS transmission may be based on a RRC configuration. At 408, the UE 402 may additionally receive, from the base station 404, an assignment to transmit on a set of X contiguous RBs. In aspects, X may be greater than 110 RBs. At 410, the UE may transmit the DMRS on each RE of one or more symbols (e.g., based on the configuration for the DMRS transmission received, at 406).

At 412a-418, the UE 402 may perform a single-symbol DMRS transmission based on a first option or a second option to transmit the DMRS on each RE of the single symbol, or the UE 402 may perform a multi-symbol DMRS transmission based on a third option or a fourth option to transmit the DMRS on each RE of a plurality of symbols. The UE 402 may perform Option 1, based on 412a, for which the UE 402 may transmit a first DMRS having a first cyclic shift based on a first port. The UE 402 may further perform Option 1, based on 412b, for which the UE 402 may transmit a second DMRS having a second cyclic shift based on a second port. The UE 402 may perform Option 2, based on 414, to transmit the DMRS on each RE of the single symbol. That is, the UE 402 may transmit the first DMRS on a first set of subcarriers (e.g., even-numbered subcarriers), and transmit the second DMRS on a second set of subcarriers (e.g., odd-numbered subcarriers).

The UE 402 may perform, at 416-418, Option 3 or Option 4 to transmit the DMRS on each RE of multiple symbols. For example, at 416, the UE 402 may perform Option 3, for which the UE 402 may transmit the first DMRS on each RE of a first symbol (e.g., symbol 2) and transmit the second DMRS on each RE of a second symbol (e.g., symbol 3). Thus, the respective REs of the first symbol and the second symbol may include different DMRS transmitted based on different ports. At 418, the UE 402 may perform Option 4, for which the first/second DMRS may be interleaved on the first symbol, and the second/first DMRS may be interleaved on the second symbol. The interleaving of the DMRS may be staggered among the first symbol and the second symbol. For example, if the first DMRS is transmitted on the even-numbered subcarriers in the first symbol, the first DMRS may be transmitted on the odd-numbered subcarriers in the second symbol. Likewise, if the second DMRS is transmitted on the odd-numbered subcarriers in the first symbol, the second DMRS may be transmitted on the even-numbered subcarriers in the second symbol. Based on 412a-418, the UE 402 may transmit, at 410, the DMRS on each RE of one or more symbols.

FIG. 5 illustrates diagrams 500-550 of Type 1 DMRS configurations based on 1 OFDM symbol and 2 OFDM symbols. A starting position of the DMRS may be OFDM symbol 2 and OFDM symbol 3. The DMRS configurations may be associated with a single-carrier waveform (e.g., DFT-s-OFDM). For configuration Type 1, a UE may be assigned a DMRS port that the UE may utilize for sending a DMRS over every other RE. For example, port 1000 may correspond to the even-numbered REs of a first code division multiplexing (CDM) group and port 1002 may correspond to the odd-numbered REs of the first CDM group, whereas port 1001 may correspond to the even-numbered REs of a second CDM group and port 1003 may correspond to the odd-numbered REs of the second CDM group. Thus, the UE may be assigned to any of the ports 1000-1003. An index to a DMRS table may be utilized to determine the port(s) that may be assigned to the UE. For instance, if the UE is rank 2 or higher, two or more ports may be assigned to the UE.

Based on DL signaling from the base station to the UE, the CDM of the DMRS ports may allow port 1000 of the first CDM group to be assigned to a first UE and port 1002 of the first CDM group to be assigned to a second UE. Thus, the UEs may estimate the channel for the respective REs that do not include a DMRS by interpolating between other respective REs that do include the DMRS. For example, if port 1000 is assigned to the first UE, the channel may be estimated by the first UE on the odd REs that do not include the DMRS for the first UE based on interpolation between the even REs that do include the DMRS for the first UE. Moreover, if port 1001 is assigned to the second UE, the channel may be estimated by the second UE on the even REs that do not include the DMRS for the second UE based on interpolation between the odd REs that do include the DMRS for the second UE. Similar procedures may be performed with respect to the second CDM group, where a "+" symbol may be indicative of REs that include DMRS and a "−" symbol may be indicative of REs that do not include DMRS.

For Type 1 DMRS configurations based on 2 OFDM symbols, DMRS patterns may be orthogonal in a 2×2 RE set (e.g., 2 REs in frequency by 2 REs in time) selected from any of the first CDM group or the second CDM group. In other words, a 2×2 block of REs selected from either the first CDM group or the second CDM group that includes either 2 REs or 4 REs associated with DMRS (e.g., indicated by the "+" symbol) may be orthogonal. In an example, if DMRS ports 1004, 1005, 1006, and 1007 are assigned to a scheduled UE and a co-scheduled UE served by the same CDM group, a PT-RS may not be utilized for the UE that receives the PDSCH.

While 2 DMRS configuration types (e.g., Type 1 and Type 2) may be utilized in NR applications, configuration Type 1 is used for PUSCH transmissions associated with single carrier waveforms (e.g., DFT-s-OFDM). The DMRS may be transmitted by the UE over every other RE, such that the base station may perform interpolation in the DL to estimate the channel over the REs that do not include the DMRS. As subcarrier spacing is increased, an accuracy of the estimations based on interpolation may decrease. Further, increasing a delay spread (DS) for non-line of sight (NLOS) channels may impair interpolation procedures, such as when a coherence frequency is decreased to a smaller value than the subcarrier spacing. Accordingly, transmitting the DMRS over each of 12 vertically arranged/contiguous REs may improve channel estimations, as interpolation procedures may not need to be performed to estimate the channel since there may be no gaps between the 12 contiguous REs.

Figure 6:
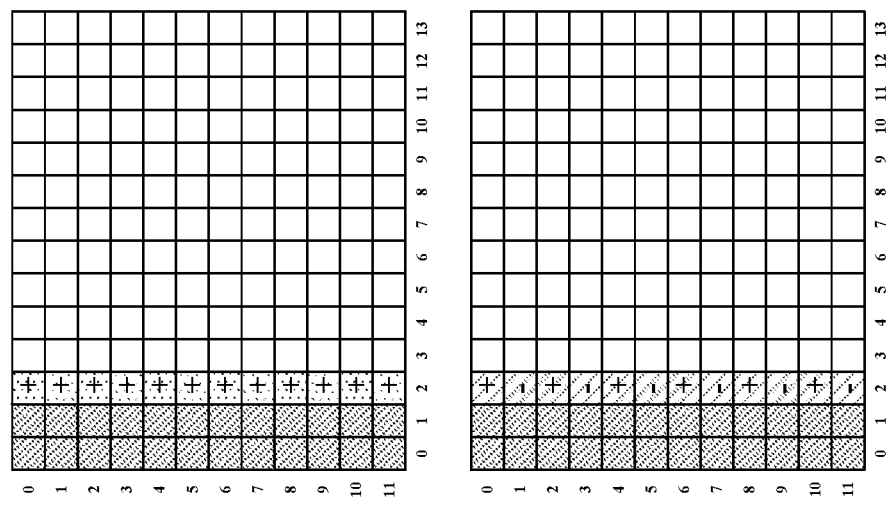
FIG. 6 illustrates DMRS that is transmitted over each RE of a symbol.

FIG. 6 illustrates a diagram 600 including DMRS transmitted over each of the 12 vertically arranged/contiguous REs per RB, which may be referred to herein as "full density" DMRS. A number of such RBs that may also be contiguous within a carrier for an assigned transmission may be greater than 110 RBs. A Type 3 configuration may be that two DMRS ports (e.g., port 1000 and port 1001) are both included in a same CDM group, such that each of the ports may be sent over the 12 vertically arranged/contiguous REs in each RB. An RRC configuration may indicate the DMRS configuration to be utilized. When full density DMRS is used for increased SCS and channels with an increased DS, a single port (e.g., port 1000) may be assigned to the UE by the base station.

If multiple ports are utilized for higher layer transmissions (e.g., rank 2 or higher), different ports may be assigned by the base station based on different cyclic shifts. The DMRS may occupy each of the 12 vertically arranged/contiguous REs on each assigned RB. Orthogonality between the ports may be provided based on different orthogonal cover codes or different cyclic shifts. For a multi-rank transmission (e.g., rank 2 or higher), first DMRS and second DMRS may be concurrently transmitted to span the same set of REs but with different cyclic shifts. For example, Port 1000 and port 1001 may span a same set of REs but with different cyclic shifts. In some aspects, the different orthogonal cover codes may correspond to the different cyclic shifts.

Figure 7B:
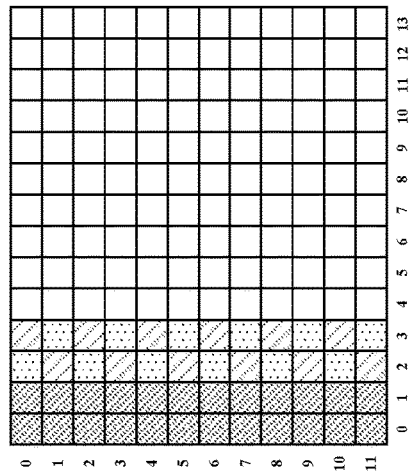
FIGS. 7A-7C illustrate single-symbol and multi-symbol configurations for transmitting DMRS over each RE of a symbol.
Figure 7C:
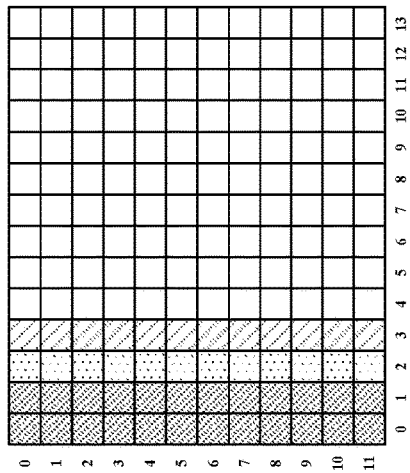
Figure 7A:
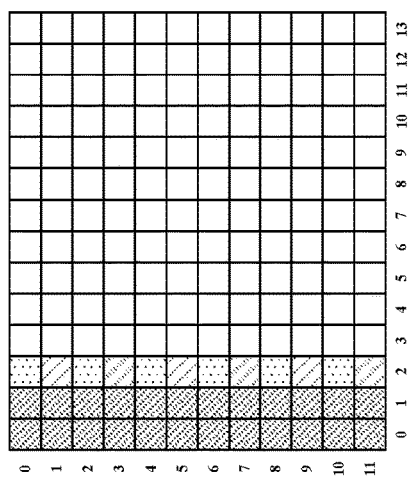

FIGS. 7A-7C illustrate diagrams 700-720 for full density DMRS associated with multiple combs and/or multiple symbols. In configurations, the full density DMRS may be based on assigning two combs to one port. A DCI table may be indicated to the UE for allowing the UE to assign the two combs on the one port. To assign two different combs to the same port, a longer sequence may be utilized which may span the subcarriers of the entire RB. The length of the sequence may be equal to the number of subcarrier allocated for the PUSCH. Thus, instead of the sequence length for single-carrier OFDM waveforms being half the number of subcarriers allocated for PUSCH, the longer sequence may correspond to a length that is equal to the entire number of subcarriers allocated for the PUSCH.

The UE may also send first DMRS on port 1 and second DMRS on port 2 as a single port (e.g., virtual port), such that the first DMRS and the second DMRS may be transmitted over each of the REs of the combined/single port (e.g., virtual port) based on a same precoding. Precoding may include determining an UL channel and/or a manner in which the UL channel modifies a signal, and adjusting the signal to counter the determined manner in which the UL channel modifies the signal. The UE may transmit the DMRS based on the precoding to increase a received quality of DMRS. The UE may send two sequences. For example, in the diagram 700, the UE may send a first comb sequence on the even-numbered subcarriers and a second comb sequence on the odd-numbered subcarriers, where the sequences of the two combs may each be equal to half the number of subcarriers allocated for the PUSCH, such that the two sequences may add up to the entire number of subcarriers allocated for the PUSCH.

If the same DMRS sequence is repeated on both combs, an increased peak-to-average-power ratio (PAPR) may be provided. To reduce the PAPR for the UE transmitting the two DMRS sequences, the two sequences may include different roots, the two sequences may include a same root but have different cyclic shifts, or a phase difference may be applied to the two sequences. In some cases, an increased PAPR may not materially affect a full density DMRS port, e.g., when an increased MCS is to be supported. The increased PAPR may provide backward-compatibility. While full density DMRS may be utilized for the MCS, the increased PAPR may be similar to the PAPR that may result from increased MCS data (e.g., 64 quadrature amplitude modulation (QAM)). The DMRS ports to be utilized by the UE may be explicitly signaled to the UE via DCI. For example, a DMRS table may include specific entries associated with sending 2 DMRS sequences and/or using a combined/longer sequence for sending the DMRS over each of the REs. For the increased MCS, the UE may perform an interpolation procedure to utilize each of the vertically arranged/contiguous REs for sending the full density DMRS signal. Alternatively, the DMRS ports to be utilized by the UE may be implicitly signaled to the UE based on a MCS threshold. For example, the UE may receive an indication to use port 1000 only, port 1001 only, or both port 1000 and port 1001.

The diagrams 710-720 illustrate multi-symbol configurations for the full density DMRS. For example, rank 2 or higher transmissions may be associated with the multi-symbol/full density DMRS. The higher layer transmissions may be based on a DFT-s waveform, where the DFT-s for a rank>1 may correspond to frequency range 4 (FR4). Different cyclic shifts may be used for multiple DMRS ports. Multiple layer DMRS provided based on a separation of the different cyclic shift may not support increased SCS and/or channels having an increased DS. Thus, a DMRS port having cyclic shift separation on one DMRS symbol may not correspond to a full density DMRS pilot per port.

To support a full density DMRS port for a higher rank transmission, multiple DMRS symbols may be grouped together. For example, two different DMRS sequences may be sent over two adjacent symbols to provide full density DMRS sequences. In the diagram 710, two adjacent symbols may have full density DMRS sequences similar to the ports of the diagram 600. In the diagram 720, the two adjacent symbols may correspond to a staggering of the DMRS pattern utilized in the diagram 700. For example, port 1000 may correspond to comb 0 on a first DMRS symbol and comb 1 on a second DMRS symbol, while port 1001 may correspond to comb 1 on the first DMRS symbol and comb 0 on the DMRS symbol. That is, the UE may be assigned two different ports for each symbol, but the ports may be different from the first DMRS symbol to the second DMRS symbol (e.g., based on different combs). For rank 1 cases based on multiple DMRS symbols, the staggering pattern may extend over vertically arranged REs of two symbols. For example, port 1000 may correspond to comb 0 on the first DMRS symbol and comb 1 on the second DMRS symbol.

Figure 8:
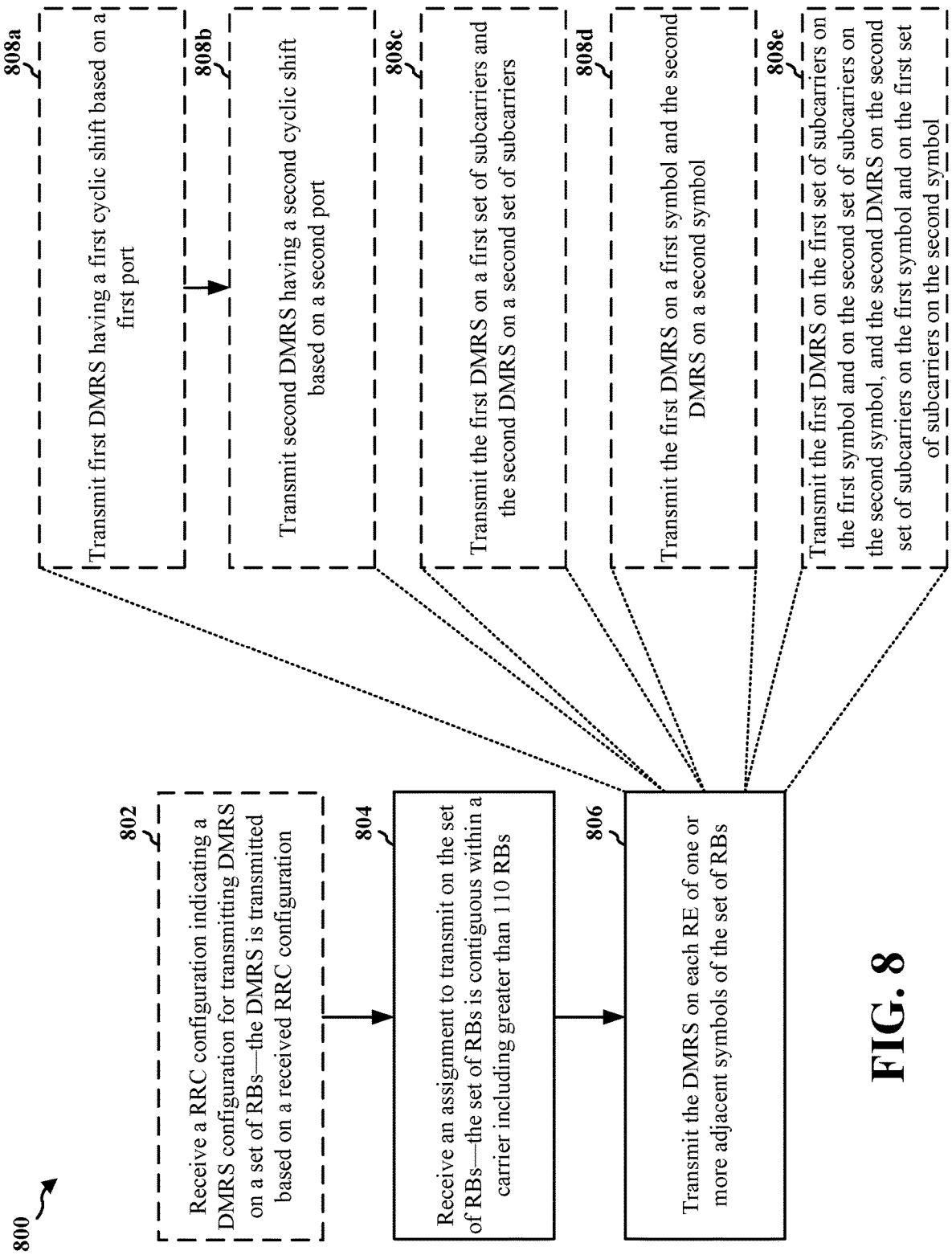
FIG. 8 is a flowchart of a method of wireless communication of a UE.

FIG. 8 is a flowchart 800 of a method of wireless communication. The method may be performed by a UE (e.g., the UE 104/402; the apparatus 902; etc.), which may include the memory 360 and which may be the entire UE 104/402 or a component of the UE 104/402, such as the TX processor 368, the RX processor 356, and/or the controller/processor 359.

At 802, the UE may receive a RRC configuration indicating a DMRS configuration for transmitting DMRS on a set of RBs—the DMRS is transmitted based on a received RRC configuration. For example, referring to FIG. 4, the UE 402 may receive, at 406 from the base station 404, a configuration for a DMRS transmission (e.g., based on RRC configuration). At 410-418, the UE 402 may transmit the DMRS based on the RRC configuration.

At 804, the UE may receive an assignment to transmit on the set of RBs—the set of RBs is contiguous within a carrier including greater than 110 RBs. For example, referring to FIG. 4, the UE 402 may receive, at 408 from a base station 404, an assignment to transmit on a set of X contiguous RBs. The set of RBs may include X RBs (e.g., where X>110 RBs), such that a length of a DMRS sequence of transmitted DMRS may be equal to X.

At 806, the UE may transmit the DMRS on each RE of one or more adjacent symbols of the set of RBs. For example, referring to FIGS. 4 and 6-7C, the UE 402 may transmit, at 410 to the base station 404, DMRS on each RE of one or more symbols. In the diagrams 600-700, the UE transmits single-symbol DMRS on each RE of symbol 2, and in the diagrams 710-720, the UE transmits multi-symbol DMRS on each RE of symbols 2-3.

At 808a, to transmit the DMRS on each RE of the set of RBs, the UE may transmit first DMRS having a first cyclic shift based on a first port. For example, referring to FIGS. 4 and 6, the UE 402 may transmit, at 412a, based on Option 1, first DMRS having a first cyclic shift based on a first port. In the diagram 600, the first DMRS may be transmitted on each RE of symbol 2 via port 1000 associated with a first CDM group.

At 808b, to transmit the DMRS on each RE of the set of RBs, the UE may transmit second DMRS having a second cyclic shift based on a second port. For example, referring to FIGS. 4 and 6, the UE 402 may transmit, at 412b, based on Option 1, second DMRS having a second cyclic shift based on a second port. In the diagram 600, the second DMRS is transmitted on each RE of symbol 2 via port 1001 associated with a second CDM group, where port 1000 and port 1001 may be different ports.

At 808c, to transmit the DMRS on each RE of the set of RBs, the UE may transmit the first DMRS on a first set of subcarriers and the second DMRS on a second set of subcarriers. For example, referring to FIGS. 4 and 7A, the UE 402 may transmit, at 414, based on Option 2, first DMRS on a first set of subcarriers and second DMRS on a second set of subcarriers. In the diagram 700, the first DMRS may be transmitted on the first set of subcarriers via port 1000 and the second DMRS may be transmitted on the second set of subcarriers via the port 1001. In aspects, the first set of subcarriers may form a first comb structure and the second set of subcarriers may form a second comb structure (e.g., interleaving/non-overlapping comb structures). The first set of subcarriers in the diagram 700 may correspond to even-numbered subcarriers, and the second set of subcarriers in the diagram 700 may correspond to odd-numbered subcarriers. The first DMRS sequence (e.g., associated with the port 1000) and the second DMRS sequence (e.g., associated with the port 1001) may have a same root and may be transmitted with different cyclic shifts, or the first DMRS sequence (e.g., associated with the port 1000) and the second DMRS sequence (e.g., associated with the port 1001) may have different roots and may be transmitted with a same cyclic shift. In aspects, the first DMRS sequence (e.g., associated with the port 1000) and the second DMRS sequence (e.g., associated with the port 1001) may be transmitted based on a phase difference.

At 808d, to transmit the DMRS on each RE of the set of RBs, the UE may transmit the first DMRS on a first symbol and the second DMRS on a second symbol. For example, referring to FIGS. 4 and 7B, the UE 402 may transmit, at 414, based on Option 3, the first DMRS on a first symbol and the second DMRS on a second symbol. In the diagram 710, the first DMRS is transmitted on each RE of symbol 2 via port 1000 in a first sequence and the second DMRS is transmitted on each RE of symbol 3 via port 1001 in a second sequence. In the set of X RBs (e.g., where X>110 RBs), a length of a first DMRS sequence and a second DMRS sequence of the transmitted DMRS may be equal to X.

At 808e, to transmit the DMRS on each RE of the set of RBs, the UE may transmit the first DMRS on the first set of subcarriers on the first symbol and on the second set of subcarriers on the second symbol, and the second DMRS on the second set of subcarriers on the first symbol and on the first set of subcarriers on the second symbol. For example, referring to FIGS. 4 and 7C, the UE 402 may transmit, at 414, based on Option 3, the first/second DMRS interleaved on a first symbol and the second/first DMRS interleaved on a second symbol. For example, the interleaving of the first/second DMRS may be staggered among the symbols. In the diagram 720, the first DMRS may be transmitted on symbol 2 on the first set of subcarriers via port 1000, and the second DMRS may be transmitted on symbol 2 on the second set of subcarriers via the port 1001. Additionally, the first DMRS may be transmitted on symbol 3 on the second set of subcarriers via port 1000, and the second DMRS may be transmitted on symbol 3 on the first set of subcarriers via the port 1001. In the set of X RBs (e.g., where X>110 RBs), a length of the first DMRS sequence and the second DMRS sequence of the transmitted DMRS may be equal to X/2.

Figure 9:
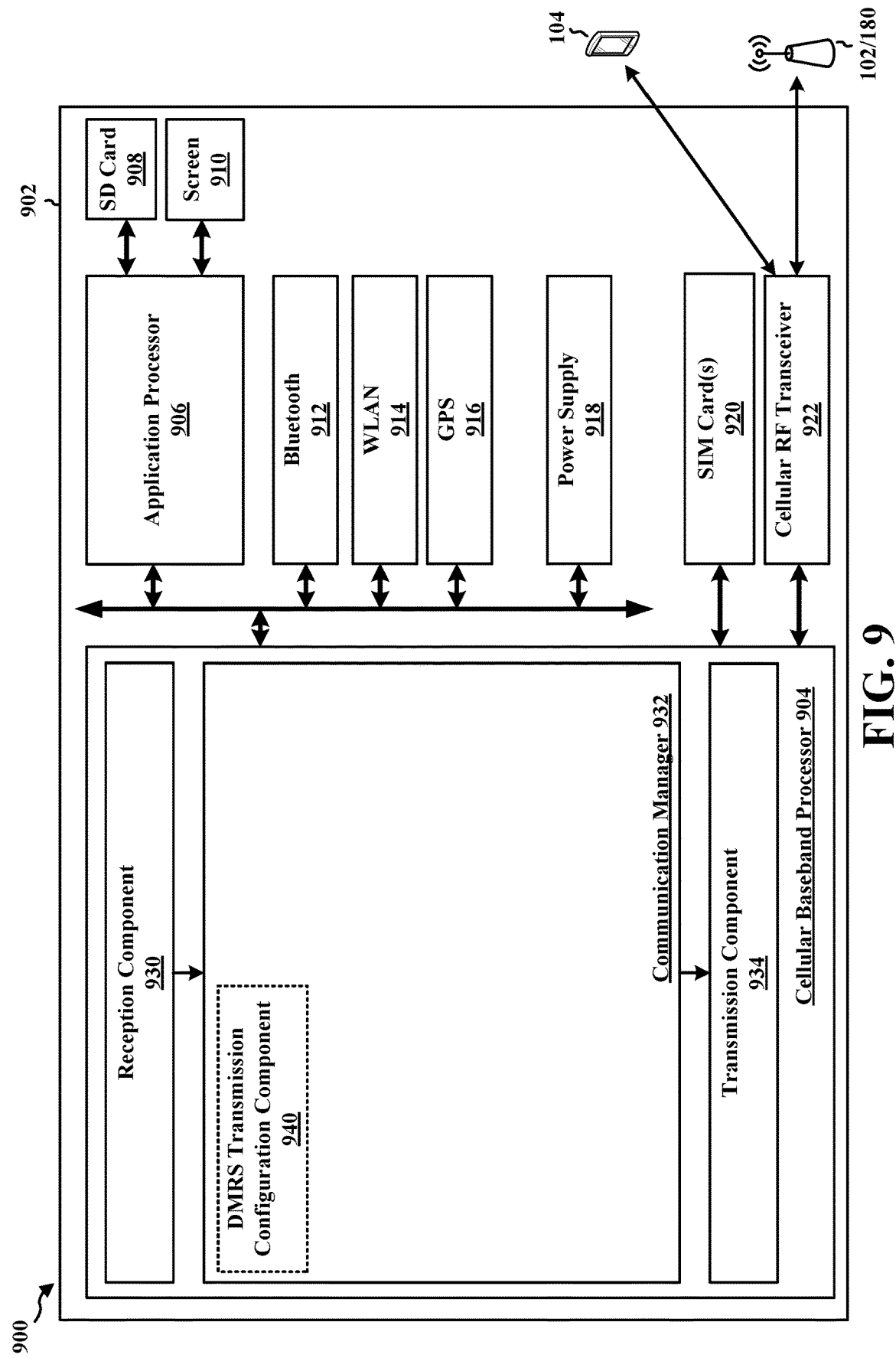
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The reception component 930 is configured, e.g., as described in connection with 802 and 804, to receive an assignment to transmit on a set of RBs—the set of RBs is contiguous within a carrier including greater than 110 RBs; and to receive a RRC configuration indicating a DMRS configuration for transmitting DMRS on the set of RBs—the DMRS is transmitted based on the received RRC configuration. The communication manager 932 includes a DMRS transmission configuration component 940 that receives input from the reception component 930 based on the received DMRS configuration, where the DMRS transmission configuration component 940 configures the apparatus 902, e.g., as described in connection with 808a-808e, to transmit first DMRS having a first cyclic shift based on a first port; to transmit second DMRS having a second cyclic shift based on a second port; to transmit the first DMRS on a first set of subcarriers and the second DMRS on a second set of subcarriers; to transmit the first DMRS on a first symbol and the second DMRS on a second symbol; and/or to transmit the first DMRS on the first set of subcarriers on the first symbol and on the second set of subcarriers on the second symbol, and the second DMRS on the second set of subcarriers on the first symbol and on the first set of subcarriers on the second symbol. The transmission component 934 receives input from the DMRS transmission configuration component 940 and, based on the configured DMRS configuration, the transmission component 934 is configured, e.g., as described in connection with 806, to transmit the DMRS on each RE of one or more adjacent symbols of the set of RBs.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving an assignment to transmit on a set of RBs, the set of RBs being contiguous within a carrier including greater than 110 RBs; and means for transmitting DMRS on each RE of one or more adjacent symbols of the set of RBs. The apparatus 902 further includes means for receiving a RRC configuration indicating a DMRS configuration for transmitting the DMRS on the set of RBs, the DMRS being transmitted based on the received RRC configuration.

In a first aspect, the means for transmitting the DMRS on each RE of the set of RBs is further configured to transmit first DMRS on each RE of the one or more adjacent symbols of the set of RBs, the first DMRS having a first cyclic shift associated with a first port.

In a second aspect, the means for transmitting the DMRS on each RE of the set of RBs is further configured to transmit second DMRS on each RE of the one or more adjacent symbols of the set of RBs, the second DMRS having a second cyclic shift associated with a second port, the second cyclic shift being different than the first cyclic shift, the second port being different than the first port.

In a third aspect, the means for transmitting the DMRS on each RE of the set of RBs is further configured to transmit first DMRS on each RE within a first set of subcarriers of the one or more adjacent symbols of the set of RBs, the first DMRS being associated with a first DMRS sequence associated with a first port; and transmit second DMRS on each RE within a second set of subcarriers of the one or more adjacent symbols of the set of RBs, the second DMRS being associated with a second DMRS sequence associated with a second port, the second DMRS sequence being different than the first DMRS sequence, the second port being different than the first port, where the first set of subcarriers and the second set of subcarriers are non-overlapping, the first set of subcarriers forming a first comb structure, the second set of subcarriers forming a second comb structure, the first comb structure and the second comb structure being interleaving, the first port and the second port forming a virtual port, the first DMRS and the second DMRS being transmitted over the virtual port with a same precoding.

In a fourth aspect, the means for transmitting the DMRS on each RE of the set of RBs is further configured to transmit first DMRS on each RE within a first symbol of the one or more adjacent symbols of the set of RBs, the first DMRS being associated with a first DMRS sequence associated with a first port; and transmit second DMRS on each RE within a second symbol of the one or more adjacent symbols of the set of RBs, the second DMRS being associated with a second DMRS sequence associated with a second port, the second DMRS sequence being different than the first DMRS sequence, the second port being different than the first port.

In a fifth aspect, the means for transmitting the DMRS on each RE of the set of RBs is further configured to transmit first DMRS on each RE within a first set of subcarriers of a first symbol of the one or more adjacent symbols of the set of RBs, the first DMRS being associated with a first DMRS sequence associated with a first port; transmit second DMRS on each RE within a second set of subcarriers of the first symbol of the one or more adjacent symbols of the set of RBs, the second DMRS being associated with a second DMRS sequence associated with a second port, the second DMRS sequence being different than the first DMRS sequence, the second port being different than the first port; transmit the first DMRS on each RE within the second set of subcarriers of a second symbol of the one or more adjacent symbols of the set of RBs; and transmit the second DMRS on each RE within the first set of subcarriers of the second symbol of the one or more adjacent symbols of the set of RBs, where the first set of subcarriers and the second set of subcarriers are non-overlapping, the first set of subcarriers forming a first comb structure, the second set of subcarriers forming a second comb structure, the first comb structure and the second comb structure being interleaving.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Accordingly, the UE may transmit the DMRS on each of 12 vertically arranged REs per RB to improve channel estimations, e.g., by excluding a need to perform interpolation procedures. Since each subcarrier of the RB may be associated with an RE that includes the DMRS, there may be no gaps between the REs for which interpolation may be performed. A number of contiguous RBs including such DMRS configurations within a carrier may be greater than 110 RBs. To transmit the DMRS on each of the REs, the UE may transmit first DMRS having a first cyclic shift based on a first port and second DMRS having a second cyclic shift based on a second port; transmit the first DMRS on a first set of subcarriers and the second DMRS on a second set of subcarriers (e.g., interleave the REs including the first DMRS and the second DMRS on a symbol of the RB); transmit the first DMRS on all 12 REs of a first symbol of the RB and the second DMRS on all 12 REs of a second symbol of the RB; or interleave the REs including the first DMRS and the second DMRS on the first symbol of the RB and interleave the REs including the second DMRS and the first DMRS on the second symbol of the RB, such that the interleaving is staggered between the first symbol and the second symbol.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, comprising: receiving an assignment to transmit on a set of RBs, the set of RBs being contiguous within a carrier including greater than 110 RBs; and transmitting DMRS on each RE of one or more adjacent symbols of the set of RBs.

Aspect 2 may be combined with aspect 1 and further includes receiving a RRC configuration indicating a DMRS configuration for transmitting the DMRS on the set of RBs, the DMRS being transmitted based on the received RRC configuration.

Aspect 3 may be combined with any of aspects 1-2 and includes that the transmitting the DMRS on each RE of the set of RBs further includes: transmitting first DMRS on each RE of the one or more adjacent symbols of the set of RBs, the first DMRS having a first cyclic shift associated with a first port.

Aspect 4 may be combined with any of aspects 1-3 and includes that the transmitting the DMRS on each RE of the set of RBs further includes: transmitting second DMRS on each RE of the one or more adjacent symbols of the set of RBs, the second DMRS having a second cyclic shift associated with a second port, the second cyclic shift being different than the first cyclic shift, the second port being different than the first port.

Aspect 5 may be combined with any of aspects 1-4 and includes that the set of RBs includes x RBs, and a length of a DMRS sequence of the transmitted DMRS is equal to x.

Aspect 6 may be combined with any of aspects 1-2 or 5 and includes that the transmitting the DMRS on each RE of the set of RBs further includes: transmitting first DMRS on each RE within a first set of subcarriers of the one or more adjacent symbols of the set of RBs, the first DMRS being associated with a first DMRS sequence associated with a first port; and transmitting second DMRS on each RE within a second set of subcarriers of the one or more adjacent symbols of the set of RBs, the second DMRS being associated with a second DMRS sequence associated with a second port, the second DMRS sequence being different than the first DMRS sequence, the second port being different than the first port, where the first set of subcarriers and the second set of subcarriers are non-overlapping, the first set of subcarriers forming a first comb structure, the second set of subcarriers forming a second comb structure, the first comb structure and the second comb structure being interleaving, the first port and the second port forming a virtual port, the first DMRS and the second DMRS being transmitted over the virtual port with a same precoding.

Aspect 7 may be combined with any of aspects 1-2 or 5-6 and includes that the first set of subcarriers corresponds to one of even subcarriers or odd subcarriers, and the second set of subcarriers corresponds to another one of the even subcarriers or the odd subcarriers.

Aspect 8 may be combined with any of aspects 1-2 or 5-7 and includes that the first DMRS sequence and the second DMRS sequence have a same root and are transmitted with different cyclic shifts.

Aspect 9 may be combined with any of aspects 1-2 or 5-8 and includes that the first DMRS sequence and the second DMRS sequence have different roots and are transmitted with a same cyclic shift.

Aspect 10 may be combined with any of aspects 1-2 or 5-9 and includes that the first DMRS sequence and the second DMRS sequence are transmitted with a phase difference.

Aspect 11 may be combined with any of aspects 1-4 and includes that the transmitting the DMRS on each RE of the set of RBs further includes: transmitting first DMRS on each RE within a first symbol of the one or more adjacent symbols of the set of RBs, the first DMRS being associated with a first DMRS sequence associated with a first port; and transmitting second DMRS on each RE within a second symbol of the one or more adjacent symbols of the set of RBs, the second DMRS being associated with a second DMRS sequence associated with a second port, the second DMRS sequence being different than the first DMRS sequence, the second port being different than the first port.

Aspect 12 may be combined with any of aspects 1-4 or 11 and includes that the set of RBs includes x RBs, and a length of the first DMRS sequence and the second DMRS sequence of the transmitted DMRS is equal to x.

Aspect 13 may be combined with any of aspects 1-2 or 5-10 and includes that the transmitting the DMRS on each RE of the set of RBs further includes: transmitting first DMRS on each RE within a first set of subcarriers of a first symbol of the one or more adjacent symbols of the set of RBs, the first DMRS being associated with a first DMRS sequence associated with a first port; transmitting second DMRS on each RE within a second set of subcarriers of the first symbol of the one or more adjacent symbols of the set of RBs, the second DMRS being associated with a second DMRS sequence associated with a second port, the second DMRS sequence being different than the first DMRS sequence, the second port being different than the first port; transmitting the first DMRS on each RE within the second set of subcarriers of a second symbol of the one or more adjacent symbols of the set of RBs; and transmitting the second DMRS on each RE within the first set of subcarriers of the second symbol of the one or more adjacent symbols of the set of RBs, where the first set of subcarriers and the second set of subcarriers are non-overlapping, the first set of subcarriers forming a first comb structure, the second set of subcarriers forming a second comb structure, the first comb structure and the second comb structure being interleaving.

Aspect 14 may be combined with any of aspects 1-2, 5-10, or 13 and includes that the set of RBs includes x RBs, and a length of the first DMRS sequence and the second DMRS sequence of the transmitted DMRS is equal to x/2.

Aspect 15 is an apparatus for wireless communication including at least one processor coupled to a memory and configured to implement a method as in any of aspects 1-14.

Aspect 16 is an apparatus for wireless communication including means for implementing a method as in any of aspects 1-14.

Aspect 17 is a computer-readable medium storing computer executable code, where the code when executed by at least one processor causes the at least one processor to implement a method as in any of aspects 1-14.

What is claimed is:

1. A method of wireless communication of a user equipment (UE), comprising:
    receiving an assignment to transmit on a set of resource blocks (RB s), the set of RB s being contiguous within a carrier including greater than 110 RBs; and
    transmitting demodulation reference signals (DMRS) on each resource element (RE) of one or more adjacent symbols of the set of RBs;
    wherein the set of RBs includes x RBs, and a length of a DMRS sequence of the transmitted DMRS is equal to x.

2. The method of claim 1, further comprising receiving a radio resource control (RRC) configuration indicating a DMRS configuration for transmitting the DMRS on the set of RBs, the DMRS being transmitted based on the received RRC configuration.

3. The method of claim 1, wherein the transmitting the DMRS on each RE of the set of RBs comprises:
    transmitting first DMRS on each RE of the one or more adjacent symbols of the set of RBs, the first DMRS having a first cyclic shift associated with a first port.

4. The method of claim 3, wherein the transmitting the DMRS on each RE of the set of RBs further comprises:
transmitting second DMRS on each RE of the one or more adjacent symbols of the set of RBs, the second DMRS having a second cyclic shift associated with a second port, the second cyclic shift being different than the first cyclic shift, the second port being different than the first port.

5. The method of claim 1, wherein the transmitting the DMRS on each RE of the set of RBs comprises:
transmitting first DMRS on each RE within a first set of subcarriers of the one or more adjacent symbols of the set of RBs, the first DMRS being associated with a first DMRS sequence associated with a first port; and
transmitting second DMRS on each RE within a second set of subcarriers of the one or more adjacent symbols of the set of RBs, the second DMRS being associated with a second DMRS sequence associated with a second port, the second DMRS sequence being different than the first DMRS sequence, the second port being different than the first port,
wherein the first set of subcarriers and the second set of subcarriers are non-overlapping, the first set of subcarriers forming a first comb structure, the second set of subcarriers forming a second comb structure, the first comb structure and the second comb structure being interleaving, the first port and the second port forming a virtual port, the first DMRS and the second DMRS being transmitted over the virtual port with a same precoding.

6. The method of claim 5, wherein the first set of subcarriers corresponds to one of even subcarriers or odd subcarriers, and the second set of subcarriers corresponds to another one of the even subcarriers or the odd subcarriers.

7. The method of claim 5, wherein the first DMRS sequence and the second DMRS sequence have a same root and are transmitted with different cyclic shifts.

8. The method of claim 5, wherein the first DMRS sequence and the second DMRS sequence have different roots and are transmitted with a same cyclic shift.

9. The method of claim 5, wherein the first DMRS sequence and the second DMRS sequence are transmitted with a phase difference.

10. The method of claim 1, wherein the transmitting the DMRS on each RE of the set of RBs comprises:
transmitting first DMRS on each RE within a first symbol of the one or more adjacent symbols of the set of RBs, the first DMRS being associated with a first DMRS sequence associated with a first port; and
transmitting second DMRS on each RE within a second symbol of the one or more adjacent symbols of the set of RBs, the second DMRS being associated with a second DMRS sequence associated with a second port, the second DMRS sequence being different than the first DMRS sequence, the second port being different than the first port.

11. The method of claim 10, wherein a length of the first DMRS sequence and the second DMRS sequence of the transmitted DMRS is equal to x.

12. The method of claim 1, wherein the transmitting the DMRS on each RE of the set of RBs comprises:
transmitting first DMRS on each RE within a first set of subcarriers of a first symbol of the one or more adjacent symbols of the set of RBs, the first DMRS being associated with a first DMRS sequence associated with a first port;
transmitting second DMRS on each RE within a second set of subcarriers of the first symbol of the one or more adjacent symbols of the set of RBs, the second DMRS being associated with a second DMRS sequence associated with a second port, the second DMRS sequence being different than the first DMRS sequence, the second port being different than the first port;
transmitting the first DMRS on each RE within the second set of subcarriers of a second symbol of the one or more adjacent symbols of the set of RBs; and
transmitting the second DMRS on each RE within the first set of subcarriers of the second symbol of the one or more adjacent symbols of the set of RBs,
wherein the first set of subcarriers and the second set of subcarriers are non-overlapping, the first set of subcarriers forming a first comb structure, the second set of subcarriers forming a second comb structure, the first comb structure and the second comb structure being interleaving.

13. An apparatus for wireless communication of a user equipment (UE), comprising:
a memory; and
at least one processor coupled to the memory and configured to:
receive an assignment to transmit on a set of resource blocks (RBs), the set of RBs being contiguous within a carrier including greater than 110 RBs;
transmit first demodulation reference signals (DMRS) on each resource element (RE) of one or more adjacent symbols of the set of RBs, the first DMRS having a first cyclic shift associated with a first port; and
transmit second DMRS on each RE of the one or more adjacent symbols of the set of RBs, the second DMRS having a second cyclic shift associated with a second port, the second cyclic shift being different than the first cyclic shift, the second port being different than the first port.

14. The apparatus of claim 13, wherein the at least one processor is further configured to receive a radio resource control (RRC) configuration indicating a DMRS configuration for transmitting the DMRS on the set of RBs, the DMRS being transmitted based on the received RRC configuration.

15. The apparatus of claim 13, wherein the set of RBs includes x RBs, and a length of a DMRS sequence of the transmitted DMRS is equal to x.

16. The apparatus of claim 13, wherein to transmit the DMRS on each RE of the set of RBs the at least one processor is further configured to:
transmit the first DMRS on each RE within a first set of subcarriers of the one or more adjacent symbols of the set of RBs, the first DMRS being associated with a first DMRS sequence associated with the first port; and
transmit the second DMRS on each RE within a second set of subcarriers of the one or more adjacent symbols of the set of RBs, the second DMRS being associated with a second DMRS sequence associated with the second port, the second DMRS sequence being different than the first DMRS sequence,
wherein the first set of subcarriers and the second set of subcarriers are non-overlapping, the first set of subcarriers forming a first comb structure, the second set of subcarriers forming a second comb structure, the first comb structure and the second comb structure being interleaving, the first port and the second port forming a virtual port, the first DMRS and the second DMRS being transmitted over the virtual port with a same precoding.

17. The apparatus of claim 16, wherein the first set of subcarriers corresponds to one of even subcarriers or odd subcarriers, and the second set of subcarriers corresponds to another one of the even subcarriers or the odd subcarriers.

18. The apparatus of claim 16, wherein the first DMRS sequence and the second DMRS sequence have a same root and are transmitted with different cyclic shifts.

19. The apparatus of claim 16, wherein the first DMRS sequence and the second DMRS sequence have different roots and are transmitted with a same cyclic shift.

20. The apparatus of claim 16, wherein the first DMRS sequence and the second DMRS sequence are transmitted with a phase difference.

21. The apparatus of claim 13, wherein to transmit the DMRS on each RE of the set of RBs the at least one processor is further configured to:
   transmit the first DMRS on each RE within a first symbol of the one or more adjacent symbols of the set of RBs, the first DMRS being associated with a first DMRS sequence associated with the first port; and
   transmit the second DMRS on each RE within a second symbol of the one or more adjacent symbols of the set of RBs, the second DMRS being associated with a second DMRS sequence associated with the second port, the second DMRS sequence being different than the first DMRS sequence.

22. The apparatus of claim 21, wherein the set of RBs includes x RBs, and a length of the first DMRS sequence and the second DMRS sequence of the transmitted DMRS is equal to x.

23. The apparatus of claim 13, wherein to transmit the DMRS on each RE of the set of RBs the at least one processor is further configured to:
   transmit the first DMRS on each RE within a first set of subcarriers of a first symbol of the one or more adjacent symbols of the set of RBs, the first DMRS being associated with a first DMRS sequence associated with the first port;
   transmit the second DMRS on each RE within a second set of subcarriers of the first symbol of the one or more adjacent symbols of the set of RBs, the second DMRS being associated with a second DMRS sequence associated with the second port, the second DMRS sequence being different than the first DMRS sequence;
   transmit the first DMRS on each RE within the second set of subcarriers of a second symbol of the one or more adjacent symbols of the set of RBs; and
   transmit the second DMRS on each RE within the first set of subcarriers of the second symbol of the one or more adjacent symbols of the set of RBs,
   wherein the first set of subcarriers and the second set of subcarriers are non-overlapping, the first set of subcarriers forming a first comb structure, the second set of subcarriers forming a second comb structure, the first comb structure and the second comb structure being interleaving.

24. The apparatus of claim 23, wherein the set of RBs includes x RBs, and a length of the first DMRS sequence and the second DMRS sequence of the transmitted DMRS is equal to x/2.

25. An apparatus for wireless communication of a user equipment (UE), comprising:
   means for receiving an assignment to transmit on a set of resource blocks (RBs), the set of RBs being contiguous within a carrier including greater than 110 RBs; and
   means for transmitting demodulation reference signals (DMRS) on each resource element (RE) of one or more adjacent symbols of the set of RBs;
   wherein the set of RBs includes x RBs, and a length of a DMRS sequence of the transmitted DMRS is equal to x.

26. A non-transitory computer-readable medium storing computer executable code, the code when executed by at least one processor causes the at least one processor to:
   receive an assignment to transmit on a set of resource blocks (RBs), the set of RBs being contiguous within a carrier including greater than 110 RBs;
   transmit first demodulation reference signals (DMRS) on each resource element (RE) within a first symbol of one or more adjacent symbols of the set of RBs, the first DMRS being associated with a first DMRS sequence associated with a first port; and
   transmit second DMRS on each RE within a second symbol of the one or more adjacent symbols of the set of RBs, the second DMRS being associated with a second DMRS sequence associated with a second port, the second DMRS sequence being different than the first DMRS sequence, the second port being different than the first port.

* * * * *